United States Patent [19]  
Oguchi

[11] Patent Number: 4,587,618  
[45] Date of Patent: May 6, 1986

[54] APPARATUS FOR CONTROLLING OPERATION OF AN INDUSTRIAL ROBOT

[75] Inventor: Yukio Oguchi, Nagano, Japan

[73] Assignee: Kabushiki Kaisha Sankyo Seiki Seisakusho, Nagano, Japan

[21] Appl. No.: 483,303

[22] Filed: Apr. 8, 1983

[30] Foreign Application Priority Data

Apr. 12, 1982 [JP] Japan ................. 57-60669

[51] Int. Cl.⁴ ............. B25J 13/00; G05B 19/42; B65G 47/90
[52] U.S. Cl. ................. 364/513; 364/170; 364/474; 901/9; 901/20
[58] Field of Search ........... 364/167, 170, 474, 513; 318/603, 574, 568; 901/9, 20

[56] References Cited

U.S. PATENT DOCUMENTS

| | | | |
|---|---|---|---|
| 3,661,051 | 5/1972 | Dunne et al. | 364/193 X |
| 3,909,600 | 9/1975 | Hohn | 364/193 X |
| 4,132,318 | 1/1979 | Wang et al. | 901/9 X |
| 4,178,632 | 12/1979 | Anthony | 901/9 X |
| 4,201,937 | 5/1980 | Irie | 901/9 X |
| 4,229,136 | 10/1980 | Panissidi | 901/9 X |
| 4,330,832 | 5/1982 | Kohzai et al. | 364/474 |
| 4,362,978 | 12/1982 | Pollard et al. | 364/513 X |
| 4,386,306 | 5/1983 | Nishimura | 364/474 X |

OTHER PUBLICATIONS

European patent application Search Report, 0091663.

Primary Examiner—Jerry Smith  
Assistant Examiner—Allen MacDonald  
Attorney, Agent, or Firm—Sughrue, Mion, Zinn, Macpeak and Seas

[57] ABSTRACT

An apparatus for controlling operation of an industrial robot having a drive source for moving an arm to a preset position to effect operation under the control of a program. The position of the arm is detected and an output in the form of an electric signal is generated by a detector. A memory stores a position signal corresponding to a prescribed position ahead of the preset position. A comparator compares signals from the electronic detector and the memory and issues a position completion signal irrespective of arm movement when the arm reaches the prescribed position. The detector, memory and comparator are added in parallel to an arm driver unit, whereby the program can proceed while the arm is being moved.

8 Claims, 4 Drawing Figures

APPARATUS FOR CONTROLLING OPERATION OF AN INDUSTRIAL ROBOT

BACKGROUND OF THE INVENTION

The present invention relates to an apparatus for controlling operation of an industrial robot.

Industrial robots capable of articulation with PTP (point-to-point) control, for example, have an arm, movable up and down, with a chuck or other tool attached to a distal end of the arm for gripping and moving a desired object. According to ordinary control processes, the arm is first moved in a horizontal plane to a preset position, and after the arm has been completely stopped, an actuator, such for example, as an air cylinder for vertical drive, is operated to move the chuck and hence the object upward and downward.

Immediately before the arm reaches the preset position, however, the drive voltage in an arm driving servo system is lowered to provide cushioning against shocks and maintain positioning accuracy. This results in a reduction in speed of travel of the arm. The starting of the actuator is delayed since it is operated after the arrival of the arm at the preset position has been confirmed. Therefore, industrial robots have suffered from a long machine cycle.

The actuator is actually put into effective operation generally with a slight time lag after a start signal has been entered. There are many sequence programs for practical industrial robots, which would not have execution problems if the actuator were operated simultaneously with operation of other parts.

SUMMARY OF INVENTION

It is an object of the present invention to shorten an interval of time required for one cycle in an industrial robot of the type described.

Another object of the present invention is to derive a positioning completion signal from an intermediate output from an arm driving unit and to set timing of generation of the positioning completion signal in a wide range.

To achieve the above objects, a positioning completion signal is generated at an earlier time than when an arm reaches a preset position in the operating condition of an actuator. When the positioning completion signal is produced, that is, while the arm is being moved, program steps for an object on a next stroke, such as the actuator, are allowed to continue. An operation control apparatus of the invention picks up an electric signal from an arm position detector in an arm driver unit, compares the electric signal with a positional signal corresponding to a prescribed position ahead of the preset positon, and produces a position completion signal based on the result of such comparison.

Embodiments of the present invention will be described with reference to the drawings and the preferred embodiment that follows.

DESCRIPTION OF THE PREFERRED EMBODIMENTS

Figure 1:
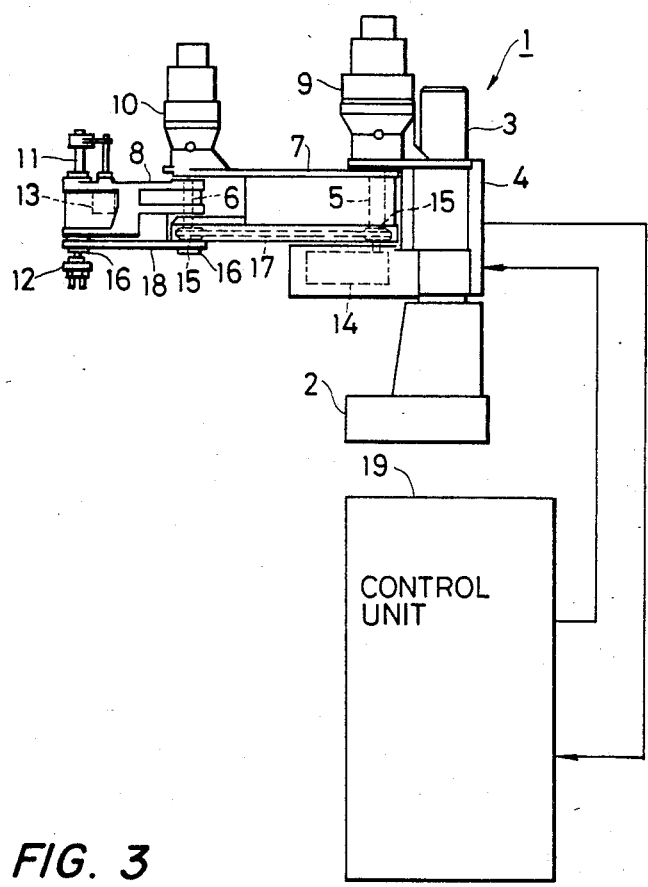
FIG. 1 is a side elevational view of an industrial robot.

FIG. 1 illustrates an industrial robot 1 having an articulating arm. The industrial robot 1 includes a base 2 with a post 3 mounted thereon. A frame 4 is attached to the post 3 and a first arm 7 is angularly movably mounted on the frame by a vertical articulation shaft 5. A second arm 8 is angularly movably mounted on a distal end of the first arm 7 by a vertical articulation shaft 6. DC servomotors 9 and 10 are mounted on the frame 4 and the first arm 7, respectively for driving the first and second arms 7, 8, respectively. A vertically movable shaft 11 is slidably supported on a distal end of the second arm 8 and has a lower end on which there is supported a chuck 12. The chuck may, for example, be driven pneumatically. The vertically movable shaft 11 is drivable by an actuator 13 such as an air cylinder mounted within the second arm 8. The frame 4 houses therein a stepper motor 14. The stepper motor 14 rotates the vertically movable shaft 11 through belt pulleys 15, 16 on the shafts 5, 6, 11 and timing belts 17, 18 to orient the chuck 12 in a horizontal plane.

The industrial robot 1 is controlled by a control unit 19 which stores an operation program. Based on the operation program, the control unit 19 drives the DC servomotors 9, 10 to turn the first and second arms 7, 8 and also actuates the air cylinder 13 to move the shaft 11 upward and downward. The control unit 19 also controls the chuck 12 to clamp and unclamp an object in relation to such controlled movements. Such programmed controlled operations are well known in the art.

Figure 2:
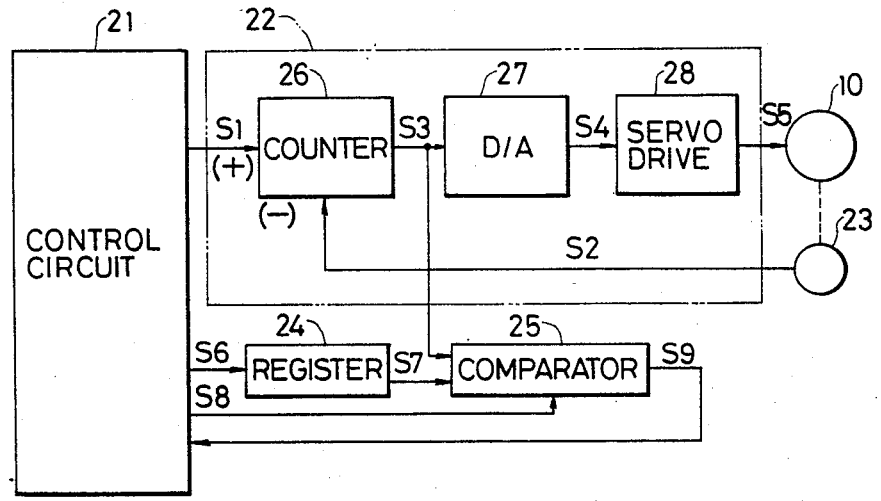
FIG. 2 is a block diagram of an apparatus for controlling operation of the industrial robot according to a preferred embodiment of the present invention.

FIG. 2 illustrates an operation control apparatus for the industrial robot according to a first embodiment of the present invention. The operation control apparatus 20 constitutes a portion of the control unit 19 and comprises a control circuit 21, an arm driver unit 22 of a digital servo system controllable by the control circuit 21, a pulse generator 23 serving as a detecting means, a register 24 serving as a memory, and a comparator 25 serving as a comparison means. The detecting means, memory and comparator are added to the arm driver unit 22.

The control circuit 21 operates under the control of the operation program for entering a digital command pulse signal S1 into the arm driver unit 22 and for effecting control required for a series of operations. The arm driver unit 22 includes a deviation counter 26 having an adding input terminal for receiving the command pulse signal S1 from the control circuit 21 and a subtracting input terminal for receiving an electrical detection pulse signal S2 from the pulse generator 23 for computing the difference between the applied signals. The counter may be a SN 74193 integrated circuit module. The arm driver unit 22 also has a D/A converter 27 for converting a digital output or deviation signal S3 from the deviation counter 26 into an analog signal. The converter may be a DAC 80Z-CBI-V unit. A servo drive unit 28 is responsive to an output signal S4 from the D/A converter 27 for producing a drive signal S5 to drive the DC servomotor 10 for the second arm 8. The pulse generator 23 comprises an incremental encoder, for example, and is mechanically coupled with the DC servomotor 10 for converting the amount of rotation thereof into the detection pulse signal S2 which is applied to the subtracting input terminal of the deviation counter 26.

Figure 3:
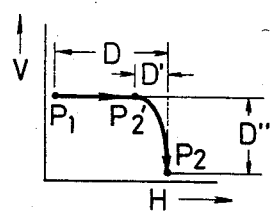
FIG. 3 is a graph showing the relationship between positions of a moving arm.

The register 24 is under the control of the control circuit 21 for storing a position setting signal S6 supplied from the control circuit 21 and dependent on a distance D' between a preset position P2 (described later on) and a prescribed or intermediate position P2' ahead of the set position P2. This is shown in FIG. 3. The signal for position P2' is delivered as a digital positional signal S7 to the comparator 25. The register 24 may be an SN 74374 device. The comparator 25 is in the form of a digital comparator, for example, for comparing the positional signal S7 with the deviation signal S3 from the deviation counter 26 in response to reception of a comparison command signal S8 from the control circuit 21. This unit may be an SN 7485 circuit. When the positional signal S7 ≧ the deviation signal S3, the comparator 25 issues a positioning completion signal S9 to the control circuit 21.

Operation of the foregoing arrangement will be described with reference to FIG. 3.

The control circuit 21 produces a command pulse signal S1 having a total of 500 pulses dependent on a distance of movement of the second arm 8 in the horizontal direction H, that is, a distance D from a preset position P1 to a preset position P2, over a period of time required for such movement in proportion to a given speed pattern. The deviation counter 26 subtracts the number of pulses of a detection pulse signal S2 from the number of pulses of the command pulse signal S1, and delivers a deviation signal S3 having a number of pulses corresponding to the difference in pulse number to the D/A converter 27. Since the deviation signal S3 is applied to the servo drive unit 28 as an analog output signal S4 from the D/A converter 27, a drive signal S5 from the servo drive unit 28 drives the DC servomotor 10 with an output voltage dependent on the analog quantity, that is, the deviation signal S3.

The second arm 8 now starts moving from the preset position P1 to the preset position P2 in accordance with speed characteristics based on the speed pattern. The distance which the second arm 8 traverses, that is, the amount of rotation of the DC servomotor 10, is detected by the pulse generator 23 and fed back as a detection pulse signal S2 to the subtracting input terminal of the deviation counter 26. The deviation counter 26 subtracts the number of pulses of the detection pulse signal S2 from the number of pulses of the command pulse signal S1. In this manner, the arm driver unit 22 effects a variable-value control. At the time when the train of all pulses, or 500 pulses, required for moving the second arm 8 from the preset position P1 to the preset position P2 is produced, the control circuit 21 generates a comparison command signal S8 to energize the comparator 25. The comparator 25 compares the number of pulses of a positional signal S7 and the number of pulses of the deviation signal S3. When the positional signal S7 ≧ the deviation signal S3, the comparator 25 produces a positioning completion signal S9 and delivers the same to the control circuit 21.

Assume now that the positional signal S7 corresponds to the number "10", the positioning completion signal S9 is produced before the DC servomotor 10 complets its rotation corresponding to the pulse number "10", or when the second arm 8 reaches a prescribed position P2'. This is as shown in FIG. 3 a distance D' ahead of the preset position P2. The time when the prescribed position P2' is reached coincides with the time when the air cylinder 13 starts to be actuated. At this time, the air cylinder 13 starts operating while the second arm 8 is moving under the control circuit 21, thereby moving the shaft 11 downwardly in the vertical direction V to allow the operation program to continue. Thus, the chuck 12 moves along a smooth arcuate path toward the preset position P2. Thereafter, when the deviation signal S3 from the deviation counter 25 falls to "0", the DC motor 10 is deenergized to stop the second arm 8 in its swinging motion.

When the air cylinder 13 is on its downward stroke at this time, the air cylinder 13 continues to move downwardly. The air cylinder 13 thus starts actuation before the second arm 8 reaches the target preset position P2. This reduces the substantial operating time for the air cylinder 13 on the sequence program as compared with the instance in which the air cylinder 13 starts operating after the second arm 8 has completed its movement. Since it is expected that the condition of positional signal S7 ≧ the deviation signal S3 happens several times during operation, the comparison command signal S8 is set to start operation of the comparator 25 after all of the pulses have been produced. Accordingly, any malfunctioning can be prevented.

An example of an operation in accordance with the first embodiment will now be described under the following conditions:

Distance D from the position P1 to P2: 100 mm
Distance D': 10 mm
Distance D" in the downward movement of chuck 12: 50 mm
Arm operating speed: 1,100 mm/sec A period of time required for the movement of an arm from P1 to P2 is 900 msec, and a period of time required for the operation of an air cylinder is 580 msec. It should be noted that each of the above periods of time includes a response time lag. A period of time required for the movement thereof from P1 to P2' is 560 msec. During the period of time (900−560=340 msec), the arm and cylinder are simultaneously operated. Then, after 290 msec, the chuck arrives at the target point P2. As a result, it is possible to effectuate a substantial saving of operating time of 340 msec.

In the foregoing first embodiment of this invention, a position setting signal S6 can only be set, due to a delay of the control system, in a range in which the number of all pulses of the command pulse signal S1 is smaller than the number of pulses of the deviation signal S3 from the deviation counter 26 when the command pulse signal is applied thereto. Accordingly, the range of the positioning completion signal S9 is limited by a time constant of the feedback loop and delays of operation speeds of various components. However, this embodiment is advantageous in operations in which the setting for the positional signal S7 from the register 24 is fixed and no resetting is necessary. The apparatus of the foregoing embodiment is simple in construction because the deviation signal S3 from the deviation counter 26 serves directly as one of the inputs to the comparator 25.

Figure 4:
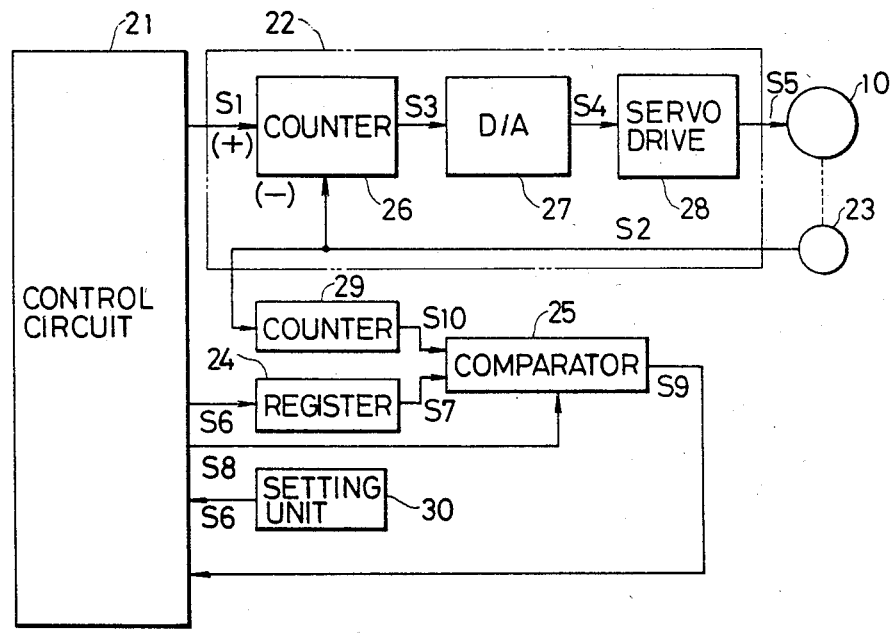
FIG. 4 is a block diagram of an apparatus for controlling operation of the industrial robot according to a second embodiment of the present invention.

FIG. 4 is illustrative of a second embodiment of the present invention. In this embodiment, a detection pulse signal S2 is applied to both the subtracting input terminal of the deviation counter 26 and an adding input terminal of another counter 29. The comparator 25 serves to compare a positional signal S7 from the register 24 with a count signal S10 from the counter 29. This counter may be implemented by the same IC used for counter 26. The comparator 25 is allowed to make such comparison on the condition that the count signal S10≧the positional signal S7. In the prescribed position P2' in FIG. 3, the setting for the position signal S7, that is, number of pulses is (500−10)="490". The pulse number can be set by a setting unit 30 such as a digital switch and given to the register 24 through the control circuit 21. In this embodiment, the count signal S10 from the counter, that is, the count therein can be set irrespective of the deviation signal S3 from the deviation counter 26. This removes any substantial limitations on the time when the positioning completion signal S9, and hence, there is greater leeway in timing setting.

In the foregoing embodiments, positioning completion is detected for the DC servomotor 10. However, such positioning completion may also be detected for the other DC servomotor 9. The first and second arms 7, 8 are generally controlled simultaneously such that they will be stopped at the same time. In actual control, the two positioning completion signals S9 for the DC servomotors 9, 10 are ANDed for reliably detecting the target prescribed position P2'.

Although in the above embodiments the DC servomotors 9, 10 are employed as drive sources, other drive sources such as straight type hydraulic actuators may also be used. In such modifications, the amounts of movement of the first and second arms 7, 8 can be detected by optical slits or magnetic scales. The first and second arms 7, 8 may be driven by the DC servomotors 9, 10 or the hydraulic actuators indirectly through belts or speed reduction gears. The arms are not limited to swinging motions, but may be movable in translation. The apparatus according to the present invention is not limited to industrial robots having articulation arms. While in the embodiments, the air cylinder 13 for vertically driving the object is described as being controlled, the invention is also applicable to control of other devices, such as a drive source for the chuck or devices for effecting associated operations required.

The present invention has the following unique advantages: The arm positioning operation can be effected at the same time as other related program steps proceed. Therefore, the overall machine cycle can be shortened, and the availability of industrial robots for desired operations can be increased. The completion of desired positioning can be detected by a simple electric means, and electrically processed, an arrangement which allows the apparatus to be simple in construction and easily put to practice.

In the embodiment in which the deviation signal and positional signals are compared in the arm driver unit, no special counter is needed and hence the construction can be simplified. In the embodiment in which the detection pulse signal is counted by the counter, the setting for positioning completion can be effected independently of a delay in the control of the arm driver unit. Furthermore, the range in which positioning is judged as being completed, that is, the positioning completion zone, can freely be set in the operation program or through an external setting unit. Accordingly, positioning completion zones can be selected to meet desired modes of movement of the arms.

What is claimed is:

1. Apparatus for controlling the operation of a point-to-point programmed controlled device having an arm movable to a predetermined position under a plurality of programmed steps, comprising:
   detection means for detecting the position of said arm and producing an output signal as said arm moves under control of a first program step;
   memory means for storing an intermediate position signal corresponding to an intermediate position during movement of said arm to said predetermined position;
   first position deriving means responsive to said output signal for deriving a first position signal indicative of the position of said arm; and
   comparator means for receiving and comparing said first position signal and said intermediate position signal and producing a position completion signal when said arm reaches said intermediate position; said position completion signal being utilized to commence execution of a second program step while said arm is moving from said intermediate position to said predetermined position.

2. The apparatus of claim 1, wherein said arm comprises an arm driver unit having a first arm element movable in one direction, means to drive said first arm element and said detection means responsive to the output of said means to drive said first arm element; a second arm element mounted on said first arm element and movable in a second direction, means for driving said second arm element and sensor means responsive to movement of said second arm element.

3. The apparatus of claim 2, wherein said means for driving said first arm comprises a servomotor and said detection means comprises a pulse generator responsive to said servomotor.

4. The apparatus of claim 1, further comprising a control circuit for storing said programmed steps, a deviation counter for determining the difference between the output of said detection means and a programmed step input to product said first position signal, and a digital-to-analog converter receiving said first position signal and producing a drive output to move said arm.

5. The apparatus of claim 1, said deriving means comprising a counter receiving the output signal from said detection means, said counter applying said first position to said comparator means.

6. The apparatus of claim 5, further comprising means for setting said intermediate position signal corresponding to said intermediate position.

7. The apparatus of claim 5, further comprising a control circuit for storing said programmed steps, a deviation counter for determining the difference between the output of said detection means and a programmed step input to produce a second position signal, and a digital-to-analog converter receiving said second position signal and producing a drive output to move said arm.

8. The apparatus of claim 7, said first position signal corresponding to a distance of said arm from a position of said arm before execution of said first program step, said second position signal corresponding to a distance of said arm from said predetermined position.

* * * * *